United States Patent [19]

Becker et al.

[11] E Re. 31,346

[45] Reissued Aug. 16, 1983

[54] ADVANCE MECHANISM FOR A MINE ROOF SUPPORT ASSEMBLY

[75] Inventors: Kunibert Becker, Werl; Willy Heyer, Bochum-Gerthe; Lubomir Plevak, Lunen; Jürgen Dodt, Menden, all of Fed. Rep. of Germany

[73] Assignee: Gewerschaft Eisenhutte Westfalia, Fed. Rep. of Germany

[21] Appl. No.: 270,721

[22] Filed: Jun. 5, 1981

Related U.S. Patent Documents

Reissue of:

[64] Patent No.: 4,195,953
Issued: Apr. 1, 1980
Appl. No.: 974,462
Filed: Dec. 29, 1978

[30] Foreign Application Priority Data

Dec. 29, 1977 [DE] Fed. Rep. of Germany ..... 2758661
Dec. 29, 1977 [DE] Fed. Rep. of Germany ..... 2758663

[51] Int. Cl.[3] ..... E21D 15/44
[52] U.S. Cl. ..... 405/300
[58] Field of Search ..... 405/291, 297, 299, 300, 405/301; 91/170 MP; 299/31, 33

[56] References Cited

U.S. PATENT DOCUMENTS 3,328,966 7/1967 Creuels et al. ..... 405/300
3,332,246 7/1967 Creuels et al. ..... 405/300
3,482,878 12/1969 Flöter ..... 405/299 X
3,525,227 8/1970 Hancock et al. ..... 405/301
3,915,500 10/1975 Schlusener et al. ..... 405/299 X
3,991,580 11/1976 Allen ..... 405/299

FOREIGN PATENT DOCUMENTS 1051783 12/1966 United Kingdom ..... 405/301

*Primary Examiner*—David H. Corbin
*Attorney, Agent, or Firm*—Sughrue, Mion, Zinn, Macpeak and Seas

[57] ABSTRACT

The invention relates to an advance mechanism for a roof support assembly constituted by a plurality of roof support units positioned side-by-side along, for example, a longwall face of a mineral mining working. The advance mechanism comprises a pair of hydraulic advance rams and a pair of resilient, generally parallel guide rods. The guide rods are interconnected at one end by means of a head-piece which is attachable to a conveyor extending along the longwall face. The other end of each guide rod is attached to a respective slide piece which is slidably guided on a respective guide rail which is attached to a floor girder of a roof support unit. The hydraulic advance rams are each pivotally attached to one of the slide pieces and to one of said floor girders. The guide rods are provided, adjacent said one end, with outwardly projecting alignment members each of which co-operates with one of said floor girders to align an associated roof support unit during its advance.

23 Claims, 3 Drawing Figures

ADVANCE MECHANISM FOR A MINE ROOF SUPPORT ASSEMBLY

Matter enclosed in heavy brackets [ ] appears in the original patent but forms no part of this reissue specification; matter printed in italics indicates the additions made by reissue.

BACKGROUND OF THE INVENTION

This invention relates to an advance mechanism for a mine roof support assembly.

A known type of mine roof support assembly is constituted by a plurality of roof support units positioned side-by-side along, for example, a longwall face. Each of the units has a roof shield supported on a floor sill by means of hydraulic props. The floor sill may be constituted by a pair of spaced-apart floor girders. In order to advance the assembly to follow the advance of the longwall face, the roof support units are advanced, individually or in groups, by means of hydraulic advance rams. During the advance of any given unit, its hydraulic props are relaxed so that its roof shield is not under load.

A known type of advance mechanism for such an assembly comprises a pair of resilient guide rods and a hydraulic advance ram. Such an advance mechanism can be positioned between the floors sills of each pair of adjacent roof support units. Alternatively, where a pair of floor girders constitute each floor sill, a respective advance mechanism can be positioned between the two floor girders of each roof support unit. In either case, the front ends of the guide rods of such an advance mechanism are attached, for example, to a longwall conveyor, and the rear ends are coupled together by means of a cross-piece. The advance ram acts on the cross-piece, the floor sill or sills providing an abutment for the ram. The cross-piece is longitudinally displaceable in slideways provides in the mutually facing sides of the two girders constituting one floor sill, or in the mutually facing sides of two adjacent floor sills. (Typical prior art arrangements are disclosed in DT-OS Nos. 2527054, DT-OS 2522111, DT-OS 25223094, DT-Gbm 1993011, DT-OS 2540091 and DT-OS 2547853).

The aim of the invention is to provide an advance mechanism for a mine roof support assembly which is simple and robust, and which serves to guide and orientate the associated roof support unit in a reliable manner even where the face is steeply inclined.

SUMMARY OF THE INVENTION

The present invention provides an advance mechanism for roof support assembly constituted by a plurality of roof support units positioned side-by-side along, for example, a longwall face of a mineral mining working, the advance mechanism comprising hydraulic advance ram means and a pair of resilient, generally parallel guide rods, the guide rods being interconnected at one end by means of a head-piece which, in use, is attachable to a conveyor extending along the longwall face, the other end of each guide rod being attached to a respective slide piece which is slidably guided on a respective guide rail which, in use, is attached to a floor girder of a roof support unit, the hydraulic advance ram means being pivotally attached to the guide rods and acting, in use, on said floor girders, wherein the guide rods are provided, adjacent said one end, with outwardly projecting alignment members each of which, in use, co-operates with one of said floor girders to align an associated roof support unit during its advance.

This type of advance mechanism enables the roof support units to be aligned accurately during their advance movements, whilst the resilience of the guide rods permits the floor girders of the units to adapt to irregularities in the floor of the mine working.

Advantageously, the hydraulic advance ram means is constituted by a pair of hydraulic advance rams each of which is pivotally attached to the slide piece of a respective guide rod. Preferably, each of the alignment members is constituted by an outwardlybent portion of the respective guide rod. These outwardlybent portions enable effective alignment to take place without fear of constraints or blockage of the movable parts of the advance mechanism.

The guide rods of the advance mechanism may be connected at said other ends. Advantageously, each of the guide rods is adjustably attached to the head-piece so as to extend therefrom by any one of a plurality of different distances.

The invention also provides a roof support assembly for use in a longwall face of a mineral mining working, the roof support assembly being constituted by a plurality of roof support units positioned side-by-side and means for advancing the roof support units towards the longwall face, the advance means being constituted by a plurality of advance mechanisms each as defined above, the guide rails of the advance mechanisms being fastened to floor girders of the roof support units.

Preferably, each advance mechanism is positioned between an adjacent pair of roof support units, the guide rails of that advance mechanism being fastened to the adjacent floor girders of that pair of roof support units. Alternatively, each roof support unit has two floor girders, and a respective advance mechanism is provided for each roof support unit, the guide rails of each advance mechanism being fastened to the mutually facing sides of the floor girders of the associated roof support unit.

Advantageously, the two floor girders associated with a given advance mechanism are each provided with an alignment device which co-operates, during the final portion of the advance movement of the associated roof support unit, with a respective one of the alignment members of the guide rods of that advance mechanism. Preferably, each alignment device has an alignment surface for sliding engagement with a complementary alignment surface on the corresponding alignment member, the alignment surfaces being inclined with respect to the direction of advance of the associated roof support unit. In practice, the two alignment devices associated with a given advance mechanism have alignment surfaces which diverge in the direction of advance of the associated roof support unit. Each alignment device/alignment member pair may also constitute a stop member.

Preferably, each alignment device is provided on the side of the respective floor girder part-away along that girder and adjacent to that end thereof which is nearer said one end of the associated guide rod. A further alignment device may be provided on each floor girder, the further alignment devices being positioned at said ends thereof and serving to co-operate with the alignment members to provide initial guiding and aligning of the roof support units before said final portion of their advance.

Advantageously, each floor girder is provided with an additional alignment device which co-operates with an additional alignment member provided on the associated slide piece.

Conveniently, the hydraulic advance ram of each advance mechanism, that, in use, is lower down an inclined face, has a longer working stroke than the other higher hydraulic advance ram of that advance mechanism. Preferably, the lower guide rod of each advance mechanism is longer than the upper guide rod.

Advantageously, at least one hydraulic advance ram of each advance mechanism is fastened to the associated floor girder by means of a longitudinally adjustable member. Preferably, each longitudinally adjustable member carries the alignment device of the associated floor girder.

BRIEF DESCRIPTION OF DRAWINGS

A mine roof support assembly incorporating advance mechanisms constructed in accordance with the invention will now be described, by way of example, with reference to the accompanying drawings, in which.

BRIEF DESCRIPTION OF PREFERRED EMBODIMENT

Figure 1:
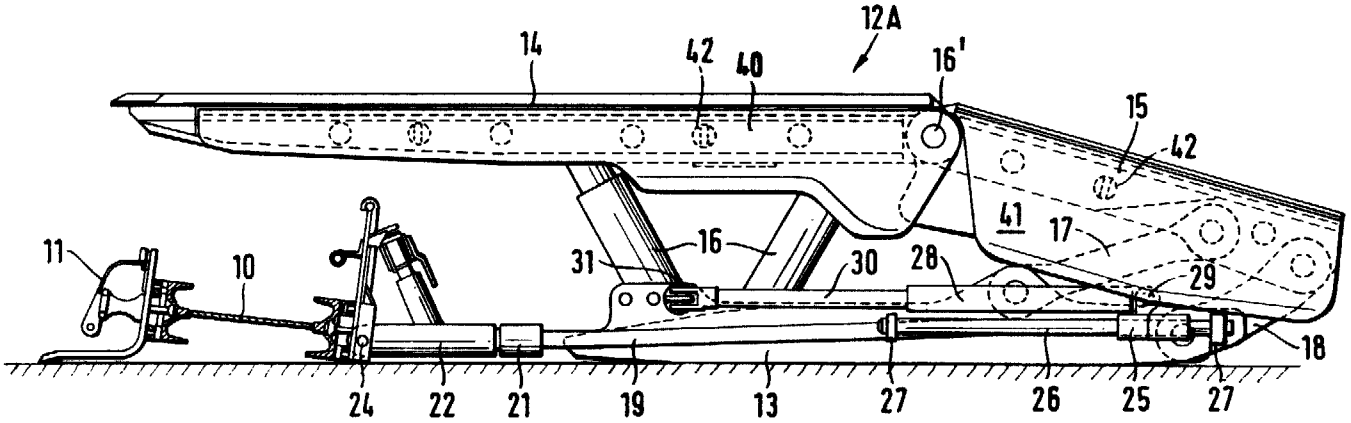
FIG. 1 is a side elevation of a one roof support unit of the assembly, together with one advance mechanism therefor.

Referring to the drawings, FIG 1 shows a scraper-chain conveyor 10 which extends along a longwall face (not shown), a guide 11 for a coal plough (or other type of winning machine) being provided at the face side of the conveyor. The goaf side of the conveyor 10 forms an abutment for the advance mechanisms of the roof support units 12A, 12B etc (see FIG. 2) of a roof support assembly.

Each of the roof support units 12A, 12B, etc. has a floor sill constituted by a pair of floor girders 13, a one-piece roof shield 14 and a goaf shield 15 pivotally connected between the floor sill and the roof shield. The roof shield 14 is supported by means of four hydraulic props 16 which are positioned in articulated joints on both the floor girders 13 and the roof shield. The goaf shield 15 is pivotally connected, at 16', to the rear (goaf) end of the roof shield 14, and is guided by links 17 and 18 which are pivotally connected to the floor girders 13 and to the goaf shield.

Figure 2:
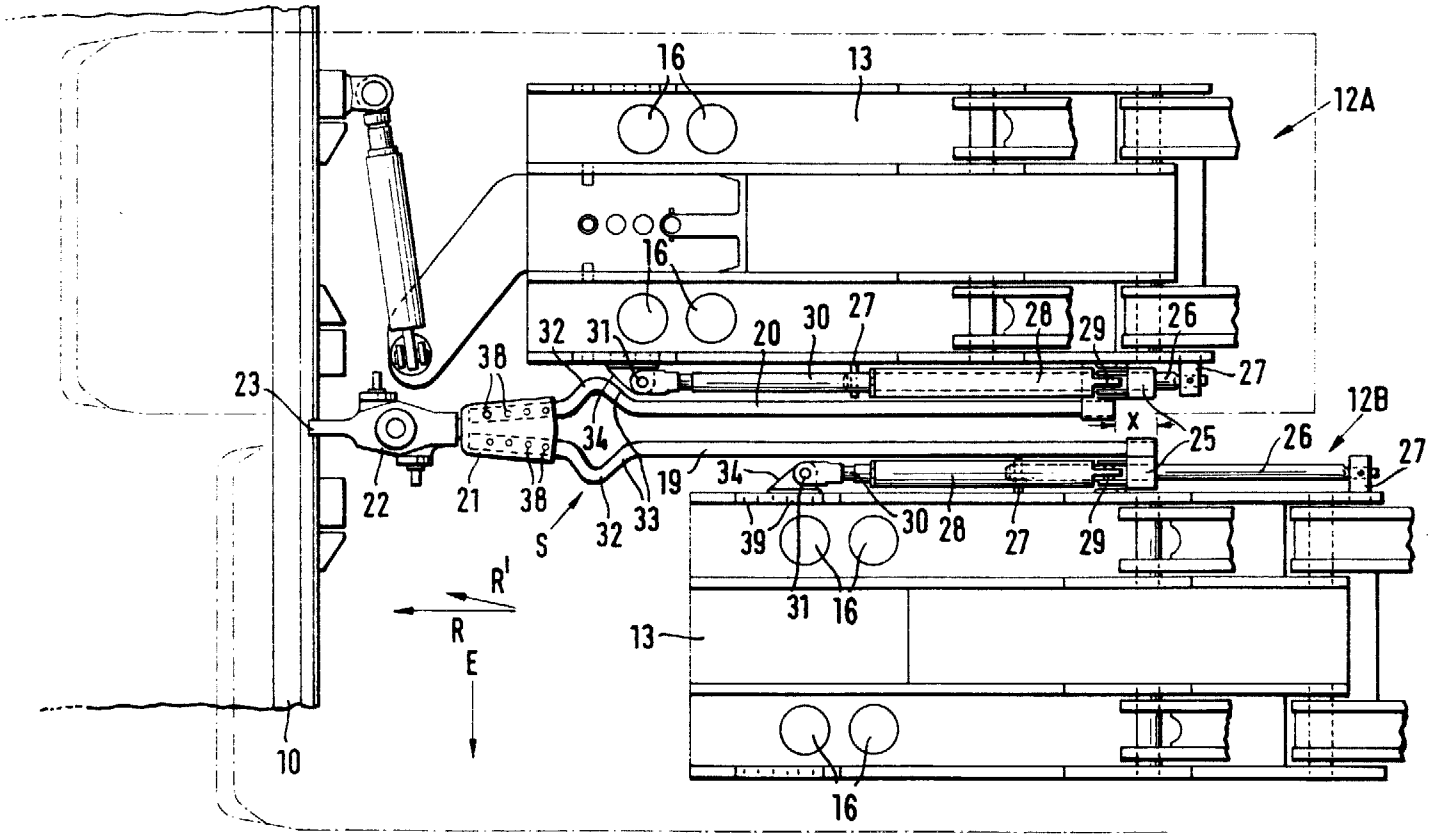
FIG. 2 is a plan view of the floor girders of two adjacent roof support units, and of an advance mechanism positioned therebetween.

An advance mechanism S is positioned between the adjacent floor girders 13 of each pair of adjacent roof support units 12A, 12B, etc. In the embodiment of FIGS. 1 and 2, each advance mechanism S includes a pair of guide rods 19 and 20 whose front ends are connected by means of a head-piece 21. The head-piece 21 is attached to a coupling member 22 which in turn is pivotally connected, by means of a bracket 23, to the conveyor 10. The pivotal axis 24 of this connection extends in the longitudinal direction of the conveyor 10. Thus, the guide rods 19 and 20 are attached to the conveyor 10 for pivotal movement only in a plane perpendicular to the face. The head-piece 21 is provided with two sets of aligned holes 38 through which pegs (not shown) can be pushed to mate with holes in the guide rods and so connect the guide rods to the head-piece in any one of a plurality of positions.

The rear end of each guide rod 19 and 20 is provided with a respective slide piece 25 which is slidably guided on a respective guide rail 26, each slide piece having a guide opening through which the corresponding guide rail extends. The guide rails 26 are secured to the two mutually facing sides of the adjacent floor girders 13 of the roof support units 12A and 12B. The two ends of each guide rail 26 are secured to its floor girder 13 by means of rail holders 27. The guide rails 26 are shorter than the guide rods 19 and 20, and extend from the rear ends of the floor girders 13 to approximately their middles.

Each advance mechanism S is provided with two double-acting hydraulic advance rams 28, the cylinder of each of which is pivotally connected, via an articulated joint 29, to the respective slide piece 25, and the piston rod 30 of each of which is pivotally connected to a bracket 31 fixed to the side of the respective floor girder 13. The brackets 31 may be longitudinally adjustably mounted on the floor girders 13.

FIG. 2 shows the roof support assembly in the position in which the roof support unit 12A (that is to say the unit higher up the inclined seam—the arrow E indicating the direction of dip) has already been advanced to follow up an advance of the conveyor 10. In order to advance the lower roof support unit 12B, its advance ram 28 is pressurised so as to extend its piston rod 30. During its advance, the upper floor girder 13 of its roof support unit 12B is guided by means of the guide rail 26 and the slide piece 25 of the guide rod 19, while the ram 28 is supported by the slide piece 25, the guide rod 19 and the head-piece 21 attached to the conveyor 10 which thus forms an abutment for the advance of the unit 12B. Although FIG. 2 shows only one advance mechanism S for the roof support unit 12B, it will be appreciated that the other (lower) floor girder 13 of that unit is also provided with an advance mechanism S which constitutes the connection to the next, lower roof support unit (not shown). Thus, each roof support unit 12A, 12B etc. is advanced and guided by two advance mechanisms S which act on its two floor girders 13. During the advance of any given roof support unit, its props 16 are, of course, relaxed so that its roof shield 14 is not loaded.

In order to advance the conveyor 10 to follow up the advance of the longwall face, the rams 28 of the relevant advance mechanisms S are pressurised so as to retract their piston rods 30 (different sections of the conveyor being advanced at different times), which serve to advance the corresponding sections of the conveyor. The guiderods 19 and 20 of the advance mechanisms S thus serve as push rods as well as guide means, the guide rods being guided on the guide rails 26. During the advance of the conveyor 10, the props 16 of the roof support units 12A, 12B, etc., are extended so that the units form an abutment for this advance.

As can be seen from FIG. 2, each of the guide rods 19 and 20 is provided, in the region of its front end, with an outwardly bent portion 32 which forms an alignment member having a surface 33 which extends at an angle to the direction R of unit advance. The alignment members 32 co-operate with inclined alignment surfaces 34 provided on the brackets 31, the surfaces 34 making the same angle with the direction R as the corresponding surfaces 33 of the alignment members 32. The arrangement of the alignment members 32 and 31 is such that, during the final portion of the advance of a given roof support unit, the surfaces of the alignment members 32 of the two guide rods 19 and 20 associated with that unit (namely the guide rod 19 "upstream" and the guide rod 20 "downstream" thereof) slide along the surfaces 34 of the corresponding brackets 31. This sliding engagement serves to align the roof support unit. Moreover, the members 32 and 31 also serve as stop members.

Figure 3:
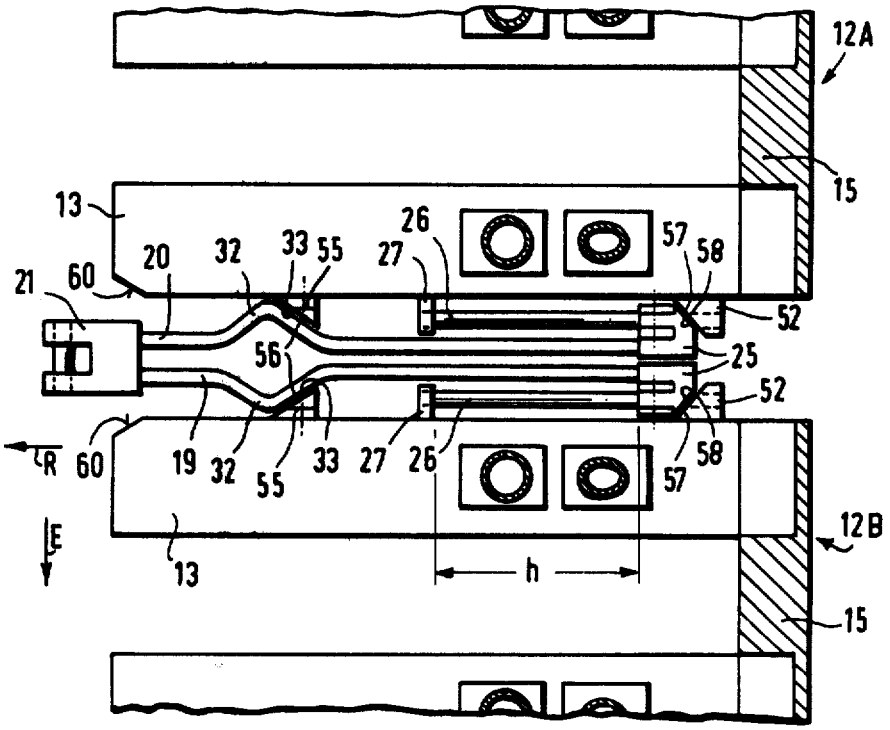
FIG. 3 shows a modification of the arrangement shown in FIG. 2.

FIG. 3 shows a modified alignment arrangement for a roof support assembly of the same type as that described above with reference to FIGS. 1 and 2. Here, however, the mutually facing front corner partitions 60 of the adjacent floor girders 13 of each pair of adjacent units are bevelled. These bevelled portions 60 co-operate with the alignment members 32 of the guide rods 19 and 20 to form a first alignment means. Wedge-shaped stop members 55 are provided on the mutually facing sides of said floor girders 13 at a predetermined distance behind the bevelled portions 60. These stop members 55 have inclined surfaces 56 which co-operate with the alignment members 32 of the guide rods 19 and 20 to form a second alignment means. They also form stops. All the surfaces 33, 56 and 60 are inclined at the same angle to the direction R of advance.

The rear (goaf side) ends of the floor girders 13 are provided with additional stop members 52. The stop members 52 are positioned adjacent to the rear ends of the guide rails 26 and are provided with inclined surfaces 57. The inclined surfaces 57 engage, during the final portion of the advance of a given roof support unit, with correspondingly inclined surfaces 58 formed on the rear end faces of the corresponding slide pieces 25, the engagement of these inclined surfaces constituting a third alignment means.

FIG. 3 shows the floor girders 13 of two roof support units 12A and 12B in the positions in which they have been advanced to follow up the advance of the conveyor (not shown but similar to the conveyor 10 of the embodiment of FIGS. 1 and 2). Here, the adjacent floor girders 13 of the two units 12A and 12B are accurately aligned and spaced from one another by a predetermined distance. As with the embodiment of FIGS. 1 and 2, the conveyor is subsequently advanced by retracting the hydraulic advance rams (not shown but similar to the rams 28 of FIGS. 1 and 2) by a distance equal to the full working stroke h of these rams. During the follow-up advance of one of the units 12A, 12B, etc, the alignment of the floor girders 13 takes place in two stages. Thus, a first, approximate alignment is effected by the first alignment means; and a second, accurate alignment is effected by the second and third alignment means. In this embodiment, the distance between the outermost points of the two bent-out portions 32 of each pair of guide rods 19 and 20 is slightly less than the predetermined distance between the adjacent floor girders 13 of each pair of adjacent roof support units.

Although each of the advance mechanisms described above is positioned between the two adjacent floor girders 13 of two adjacent units, it will be apparent that each such advance mechanism could be placed, instead, between the two floor girders of one such roof support unit. Moreover, where the advance mechanisms are positioned between the roof support units, a single floor girder could constitute the floor sill of each unit.

Where the face is steeply inclined, the guide rod 19 of each advance mechanism lower in the direction E of dip may be longer than the other higher guide rod 20 of that advance mechanism. In this case, the hydraulic advance ram 28 associated with the longer guide rod 19 has a longer working stroke than the ram associated with the guide rod 20.

We claim:

1. An advance mechanism for a roof support assembly constituted by a plurality of roof support units positioned side-by-side along, for example, a longwall face of a mineral mining working, the advance mechanism comprising hydraulic advance ram means and a pair of resilient, generally parallel guide rods, the guide rods being interconnected at one end by means of a head-piece which is attachable to a conveyor extending along the longwall face, the other end of each guide rod being attached to a respective slide piece which is slidably guided on a respective guide rail which is attached to a floor girder of a roof support unit, the hydraulic advance ram means being pivotally attached to the guide rods and to said floor girders, wherein the guide rods are provided, adjacent said one end, with outwardly projecting alignment members each of which co-operates with one of said floor girders to align an associated roof support unit during its advance.

2. An advance mechanism according to claim 1, wherein the hydraulic advance ram means is constituted by a pair of hydraulic advance rams each of which is pivotally attached to the slide piece of a respective guide rod.

3. An advance mechanism according to claim 2, wherein each of the alignment members is constituted by an outwardly-bent portion of the respective guide rod.

4. An advance mechanism according to claim 1, wherein the guide rods are unconnected at said other ends.

5. An advance mechanism as claimed in any one of claims 1 to 4, wherein each of the guide rods is adjustably attached to the head-piece so as to extend therefrom by any one of a plurality of different distances.

6. A roof support assembly for use in a longwall face of a mineral mining working, the roof support assembly being constituted by a plurality of roof support units positioned side-by-side and means for advancing the roof support units towards the longwall face, each of the roof support units having at least one floor girder, the advance means being constituted by a plurality of advance mechanisms each of which comprises hydraulic advance ram means and a pair of resilient, generally parallel guide rods, the guide rods being interconnected at one end by means of a head-piece which is attachable to a conveyor extending along the longwall face, the other end of each guide rod being attached to a respective slide piece which is slidably guided on a respective guide rail which is attached to a respective floor girder, the hydraulic advance ram means being pivotally attached to the guide rods and to said floor girders, wherein the guide rods of each advance mechanism are provided, adjacent said one end, with outwardly projecting alignment members each of which co-operates with one of the floor girders associated with that advance mechanism to align the respective roof support unit during its advance.

7. A roof support assembly according to claim 6, wherein each advance mechanism is positioned between an adjacent pair of roof support units, the guide rails of that advance mechanism being fastened to the adjacent floor girders of that pair of roof support units.

8. A roof support assembly according to claim 6, wherein the two floor girders associated with a given advance mechanism are each provided with an alignment device which co-operates, during the final portion of the advance movement of the associated roof support unit, with a respective one of the alignment members of the guide rods of that advance mechanism.

9. A roof support assembly according to claim 8, wherein each alignment device has an alignment surface for sliding engagement with a complementary alignment surface on the corresponding alignment member, the alignment surfaces being inclined with respect to the direction of advance of the associated roof support unit.

10. A roof support assembly according to claim 8, wherein each alignment device and alignment member pair also constitutes a stop member.

11. A roof support assembly according to claim 8, wherein each alignment device is provided on the side of the respective floor girder part-away along that girder and adjacent to that end thereof which is nearer said one end of the associated guide rod.

12. A roof support assembly according to claim 11, wherein a further alignment device is provided on each floor girder, the further alignment devices being positioned at said ends thereof and serving to co-operate with the alignment members to provide initial guiding and aligning of the roof support units before said final portion of their advance.

13. A roof support assembly according to claim 8, wherein each floor girder is provided with an additional alignment device which co-operates with an additional alignment member provided on the associated slide piece.

14. A roof support assembly according to claim 6, wherein the hydraulic advance ram means of each advance mechanism is constituted by a pair of hydraulic advance rams each of which is pivotally attached to the slide piece of a respective guide rod.

15. A roof support assembly according to claim 14, wherein the hydraulic advance ram of each advance mechanism, that is lower down an inclined face, has a longer working stroke than the other, higher hydraulic advance ram of that advance mechanism.

16. A roof support assembly according to claim 15, wherein the lower guide rod of each advance mechanism is longer than the upper guide rod.

17. A roof support assembly according to claim 14, wherein at least one hydraulic advance ram of each advance mechanism is fastened to the associated floor girder by means of a longitudinally adjustable member.

*18. A roof support assembly for use in a longwall face of a mineral mining working, the roof support assembly being constituted by a plurality of roof support units positioned side-by-side, and means for advancing the roof support units towards the longwall face, each of the roof support units having at least one floor girder, the advance means being constituted by a plurality of external advance mechanisms, each advance mechanism comprising a pair of hydraulic advance rams and a pair of resilient, generally parallel guide rods, the guide rods being interconnected at one end by means of a head-piece which is attachable to a conveyor extending along the longwall face, the other end of each guide rod being attached to a respective slide piece which is slidably guided on a respective guide rail which is attached to a floor girder of a roof support unit, each hydraulic advance ram being pivotally attached to a respective one of the slide pieces and being pivotally attached to the floor girder associated with that slide piece, wherein each advance mechanism is positioned between an adjacent pair of roof support units, the guide rails of that advance mechanism being fastened to the adjacent floor girders of that pair of roof support units.*

*19. A roof support assembly according to claim 18, wherein the guide rods of each advance mechanism are unconnected at said other ends.*

*20. A roof support assembly according to claim 18, wherein each of the guide rods of each advance mechanism is adjustably attached to the associated head-piece so as to extend therefrom by any one of a plurality of different distances.*

*21. A roof support assembly according to claim 18, wherein the hydraulic advance ram of each advance mechanism, that, in use, is lower down an inclined face, has a longer working stroke than the other higher hydraulic advance ram of that advance mechanism.*

*22. A roof support assembly according to claim 21, wherein the lower guide rod of each advance mechanism is longer than the upper guide rod.*

*23. A roof support assembly according to claim 6, wherein each of said alignment members comprises an outwardly-bent portion of the respective guide rod.*

* * * * *